DUNBAR & McNAUGHT.
Straw Carrier.
No. 61,816. Patented Feb. 5, 1867.
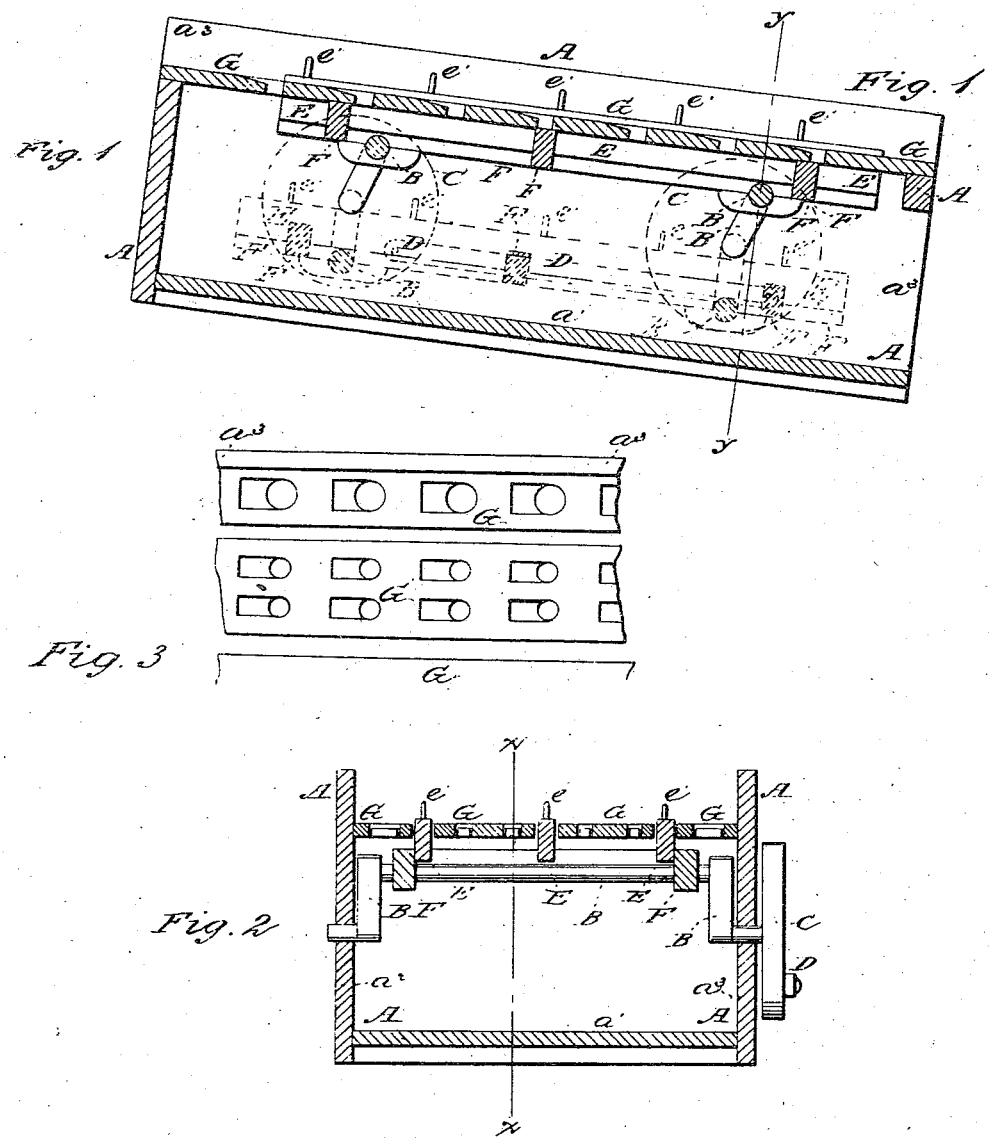

United States Patent Office.

A. T. DUNBAR AND A. McNAUGHT, OF ALBA, PENNSYLVANIA.

Letters Patent No. 61,816, dated February 5, 1867.

---

IMPROVEMENT IN COMBINED GRAIN-SEPARATOR AND STRAW-CARRIER.

---

The Schedule referred to in these Letters Patent and making part of the same.

---

TO ALL WHOM IT MAY CONCERN:

Be it known that we, ALVIN T. DUNBAR, and ARCHIBALD McNAUGHT, of Alba, in the county of Bradford, and State of Pennsylvania, have invented a new and useful Improvement in Combined Grain-Separator and Straw-Carrier; and we do hereby declare that the following is a full, clear, and exact description thereof, which will enable others skilled in the art to make and use the same, reference being had to the accompanying drawings forming part of this specification, in which—

Figure 1 is a vertical longitudinal section of our improved apparatus, taken through the line $x\,x$, fig. 2.
Figure 2 is a vertical cross-section of the same, taken through the line $y\,y$, fig. 1.
Figure 3 is a detail top view of a portion of the stationary separator-boards.
Similar letters of reference indicate like parts.

Our invention has for its object to furnish an improved apparatus, durable and simple in construction, for separating the grain from the straw as they come from the threshing machine. And it consists in the combination of the slotted and perforated stationary separator-boards, and the toothed beater-bars with each other, with the crank-shafts, and with the frame of the machine, when the said boards and beaters are constructed and operated substantially as hereinafter more fully described.

A is the frame or case of the machine, along the bottom $a$ of which the grain passes to the cleaning-mill. B are two crank-shafts revolving in bearings in the sides $a^2$ and $a$ of the machine, and which are placed the one in the forward and the other in the back part of said machine. To the ends of the shaft B, projecting through one of the sides, as $a^3$, are attached drive-wheels, C, which are connected to each other by the pitman D, so that the said wheels and cranks may revolve together. E are the beaters or bars which are attached to the crank-shafts B, or to a frame, F, attached to said shafts. The drawings represent the beaters E as being attached to a frame, F, but we prefer to connect them directly to the crank-shaft, as being more simple in construction and equally effective. From the upper side of the beaters E project teeth, $e'$, which take hold of the straw and carry it forward with the forward movement of the said beaters E. G are the separator-boards, which are secured to the frame A of the machine in such a position that the beaters E may rise through and a little above the said boards in their upward and forward movement. The separator-boards G should be from four to six inches wide, and should be placed at a distance apart equal to the thickness of the beaters E, so that the said beaters may move freely between the said boards, as shown in fig. 2. The boards G are perforated with one or more rows of holes, one side of said holes being bevelled off, to allow the grain more easily to find its way into and through them, as shown in figs. 1, 2, and 3. When operated, the beaters E rise through the slots between the boards G, striking the straw a smart blow on its under side, jarring out the grain, and carrying the said straw forward the length of a stroke. The straw then lies at rest until the beaters again rise and operate upon it. The grain, when separated from the straw, passes down through the openings in the boards G to the bottom $a^1$ of the machine, along which it passes to the cleaning-mill. The machine is driven by the same power that drives the threshing machine and cleaning-mill, in connection with which it is used, and should be set with its open end towards the cleaning-mill, and at such an inclination that the grain may pass freely along its bottom, $a^1$, to the said mill.

We claim as new, and desire to secure by Letters Patent—

The separator-boards G, perforated with holes, one side of each hole being bevelled off, as herein described, the reciprocating beaters E attached to the frame F upon the crank-shaft B, so that at each revolution of the said crank-shaft B, all the beaters may pass at the same time through the separator-boards, when all are constructed and arranged as herein set forth.

A. T. DUNBAR,
A. McNAUGHT.

Witnesses:
W. G. ANDRESS,
J. W. WARREN.